(12) United States Patent
Barbo et al.

(10) Patent No.: US 12,480,615 B2
(45) Date of Patent: Nov. 25, 2025

(54) ADJUSTABLE CAMERA MOUNT

(71) Applicant: Torc Robotics, Inc., Blacksburg, VA (US)

(72) Inventors: Derek Barbo, Blacksburg, VA (US); Trevor Joseph Brooks, Blacksburg, VA (US); Kevin Collins, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 144 days.

(21) Appl. No.: 18/407,077

(22) Filed: Jan. 8, 2024

(65) Prior Publication Data
US 2025/0224072 A1 Jul. 10, 2025

(51) Int. Cl.
*F16M 11/12* (2006.01)
*G03B 17/56* (2021.01)
*B60R 11/04* (2006.01)

(52) U.S. Cl.
CPC ......... *F16M 11/126* (2013.01); *G03B 17/561* (2013.01); *B60R 11/04* (2013.01)

(58) Field of Classification Search
CPC .............................. F16M 11/18; F16M 11/126
See application file for complete search history.

(56) References Cited

U.S. PATENT DOCUMENTS

| | | | |
|---|---|---|---|
| 4,341,452 A | 7/1982 | Korling | |
| 4,655,548 A | 4/1987 | Jue | |
| 7,425,101 B2 * | 9/2008 | Cheng | G03B 17/00 396/419 |
| 8,224,167 B2 | 7/2012 | Lai | |
| 8,379,089 B2 * | 2/2013 | Lee | H04N 23/50 348/151 |
| 2020/0371310 A1 * | 11/2020 | Yu | B64U 20/87 |

* cited by examiner

*Primary Examiner* — Leon W Rhodes, Jr.
(74) *Attorney, Agent, or Firm* — Armstrong Teasdale LLP

(57) ABSTRACT

Apparatus and methods for adjusting pitch and yaw orientations of a mount are disclosed. The pitch and yaw orientations are adjusted relative to respective axes about their intersection point. The mount comprises a base; a yaw adjustment assembly on the base and movable about a yaw axis; a pitch adjustment assembly on the base and adjacent the yaw adjustment assembly, and movable with the yaw assembly. A camera support is between the yaw adjustment assembly and pitch adjustment assembly, the camera support being rotatable about a pitch axis, and movable about the yaw axis with the adjustment assemblies. The pitch axis and the yaw axis intersect at an intersection point, the pitch orientation of the camera support being adjustable about the pitch axis at the intersection point and the yaw orientation of the pitch and yaw assemblies and camera support being adjustable about the yaw axis at the intersection point.

13 Claims, 9 Drawing Sheets

ADJUSTABLE CAMERA MOUNT

TECHNICAL FIELD

The field of the disclosure relates generally to a camera mount and more specifically to a camera mount that provides for adjustment to the mount yaw and pitch orientations.

BACKGROUND

Vehicles, such as autonomous vehicles include externally mounted devices such as sensors, cameras and the like that generally provide environmental perception, and the environmental perception activity yields information relating to the area surrounding the vehicle. Environmental perception typically includes object detection and understanding and may be based at least in part on data collected by acoustic sensors, image data collected, for example, by LiDAR sensors, radar, sonar, ultrasonic, or visual or RGB cameras, among other suitable active or passive sensors. The information associated with the area surrounding the vehicle may provide an understanding of the direction and speed associated with the vehicle supporting the environmental perception equipment. Additionally, information relating to the area surrounding the vehicle may comprise, information capturing the motion of other vehicles in the area surrounding the vehicle and objects along the road.

Environmental devices comprising a camera are mounted along the exterior of the vehicle body and oriented in a manner that enables the camera to achieve an unobstructed field of view of a portion of the area surrounding the vehicle. Such obstructions may include the vehicle body or vehicle bumper, for example. When installed, the camera is mounted along the vehicle body and oriented so that when the camera installation is complete, the camera is able to effectively capture the field of view of the associated portion of the area surrounding the vehicle. During use, the camera is subjected to regular vibratory disturbances. Over time, the vibratory disturbances can cause the camera to reorient undesirably relative to the installed camera orientation. Such reorientation frequently causes the respective camera's field of view to become obstructed. As a result, it is necessary to return the camera to the orientation that provides an unobstructed field of view for the camera. Cameras may reorient on a regularly. Also, because cameras are mounted along the vehicle exterior, the camera mounts are exposed to ambient conditions such as rain, snow and airborne particulate matter. If the camera mount does not comprise suitable sealing structure, the ambient conditions may negatively impact the camera mount components and camera mount functionality.

Therefore, as discussed in more detail below, it would be advantageous to have a camera mount that: comprises a sealing structure that minimizes the negative impact of ambient conditions on camera mount components and functionality, and also maintains the supported camera in the desired orientation, does not need to be adjusted frequently, and when adjustment is required enables the camera to be easily adjusted.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a mount for adjusting the orientation of a camera having a focal point is disclosed. The mount comprises a base; a yaw adjustment assembly located on the base and movable about a yaw axis; a pitch adjustment assembly located on the base, the pitch adjustment assembly being located adjacent the yaw adjustment assembly on the base and movable with the yaw adjustment assembly; and a camera support, the camera support being located between the yaw adjustment assembly and pitch adjustment assembly, the camera support being rotatable about a pitch axis and movable about the yaw axis with the pitch adjustment assembly and the yaw adjustment assembly. The pitch axis and the yaw axis intersect at an intersection point, the pitch orientation of the camera support being adjustable about the pitch axis at the intersection point and the yaw orientation of the pitch and yaw assemblies and camera support being adjustable about the yaw axis at the intersection point.

In another aspect, a mount for adjusting the orientation of a camera is provided. The mount comprises a base and a yaw adjustment assembly located on the base and movable about a yaw axis. The yaw adjustment assembly comprises a yaw wheel and a yaw gear housing supported on the base. The yaw gear housing comprises a yaw worm gear chamber, and a yaw wheel chamber. A yaw worm gear is located in the yaw worm gear chamber, and a portion of the yaw wheel is located in the yaw wheel chamber when the yaw gear housing is located on the base. The yaw worm gear and yaw wheel are in engagement, and a yaw fastener is connected to the worm gear to rotate the worm gear in response to movement of the yaw fastener. A pitch adjustment assembly is located on the base. The pitch adjustment assembly is connected to the yaw adjustment assembly to be movable with the yaw adjustment assembly about the yaw axis. The pitch adjustment assembly comprises: an outer pitch gear housing defining a chamber, a pitch wheel and a pitch worm gear are located in the chamber, the pitch worm gear being in engagement with the pitch wheel, and a pitch fastener connected to the pitch worm gear to rotate the pitch worm gear in response to movement of the pitch fastener. The pitch adjustment assembly also comprises an inner pitch housing comprising an inner pitch housing chamber, a portion of the yaw wheel being located in the inner pitch housing chamber when the pitch adjustment assembly is located on the base. The camera mount also comprises a camera support. The camera support is located between and is connected to the yaw adjustment assembly and the pitch adjustment assembly to be movable with the pitch and yaw assemblies about the yaw axis, the camera support also being rotatable about a pitch axis in response to movement of the pitch fastener to adjust the pitch orientation of the camera support, the pitch axis and the yaw axis intersecting at an intersection point, the pitch orientation of the camera support being adjustable about the pitch axis at the intersection point and the yaw orientation of the pitch and yaw assemblies and support being adjustable about the yaw axis at the intersection point.

In yet another aspect, a method for adjusting the pitch and yaw orientations of a camera mount is disclosed. In the method for adjusting the pitch and yaw orientations of a camera mount the camera mount comprises a base, a yaw adjustment assembly, a pitch adjustment assembly connected to the yaw adjustment assembly where the yaw and pitch adjustment assemblies are supported on the base, and a camera support connected to the yaw and pitch adjustment assemblies to be movable with the assemblies about a yaw axis in response to movement of a yaw fastener, the camera support being rotatable about a pitch axis in response to movement of a pitch fastener; and the method comprises reviewing the position of the mount; and based on the review, if the adjustment of the mount yaw orientation is required; adjusting the yaw orientation of the yaw and pitch assemblies and camera support by rotating the yaw fastener to thereby move the assemblies and support about the yaw axis; and if the adjustment of the mount pitch orientation is required: adjusting the pitch orientation of the camera support by rotating the pitch fastener to thereby move the camera support about a pitch axis.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
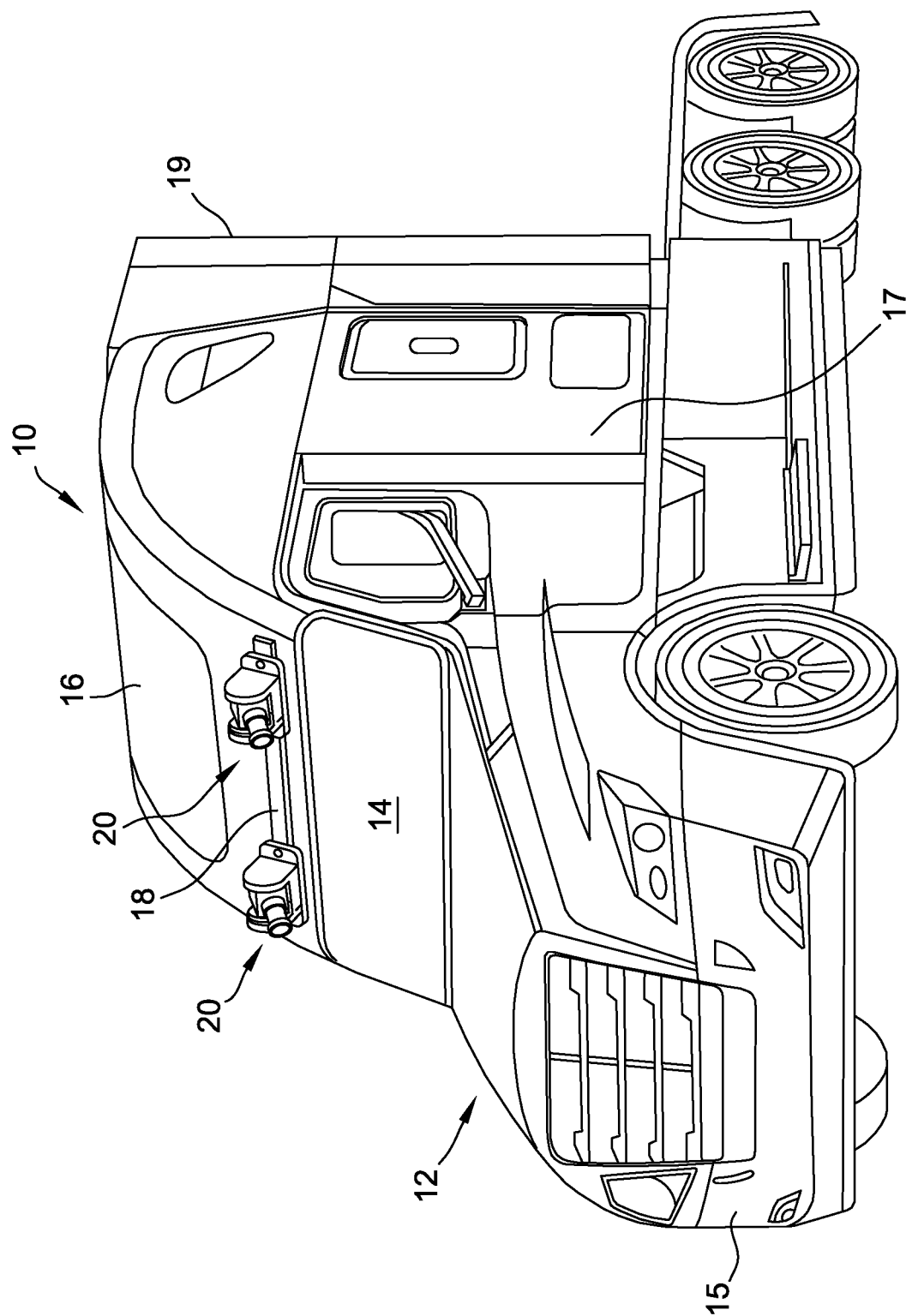
FIG. 1 is a schematic representation of a vehicle with the adjustable camera mount of the present embodiment fixed to the vehicle.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

An exemplary technical effect associated with the methods, systems, and apparatus described herein includes at least one of: (a) an adjustable mount for a camera that enables the camera yaw and pitch orientations to be precisely modified about the intersection point of the yaw and pitch axes; (b) improved stability of camera mount orientation, minimizing reorientation in response to vibratory disturbances; and (c) a mount sealing structure that minimizes damage to mount components and mount functionality due to use.

The adjustable camera mount having the associated one or more exemplary technical effects described in the previous paragraph is generally shown in FIGS. 1, 2, 3 and 7. FIG. 1 shows a vehicle 10. As disclosed the vehicle 10 comprises a cab 12 that may be used to transport a trailer (not shown). The vehicle cab 12 includes a windshield 14 and an airfoil 16 that directs the air over the cab and to the rear of vehicle 10. The vehicle may be a fully autonomous vehicle, semi-autonomous vehicle of a vehicle that is driven by a human driver. A frame 18 is fixed to the airfoil 16, above the windshield 14. The frame 18 may be a metal bar or other suitable structure that is able to support at least one adjustable mount 40 for use with vehicle 10. The frame 18 is connected to the airfoil using conventional fasteners, adhesive substance or other suitable conventional device or method.

Figure 2:
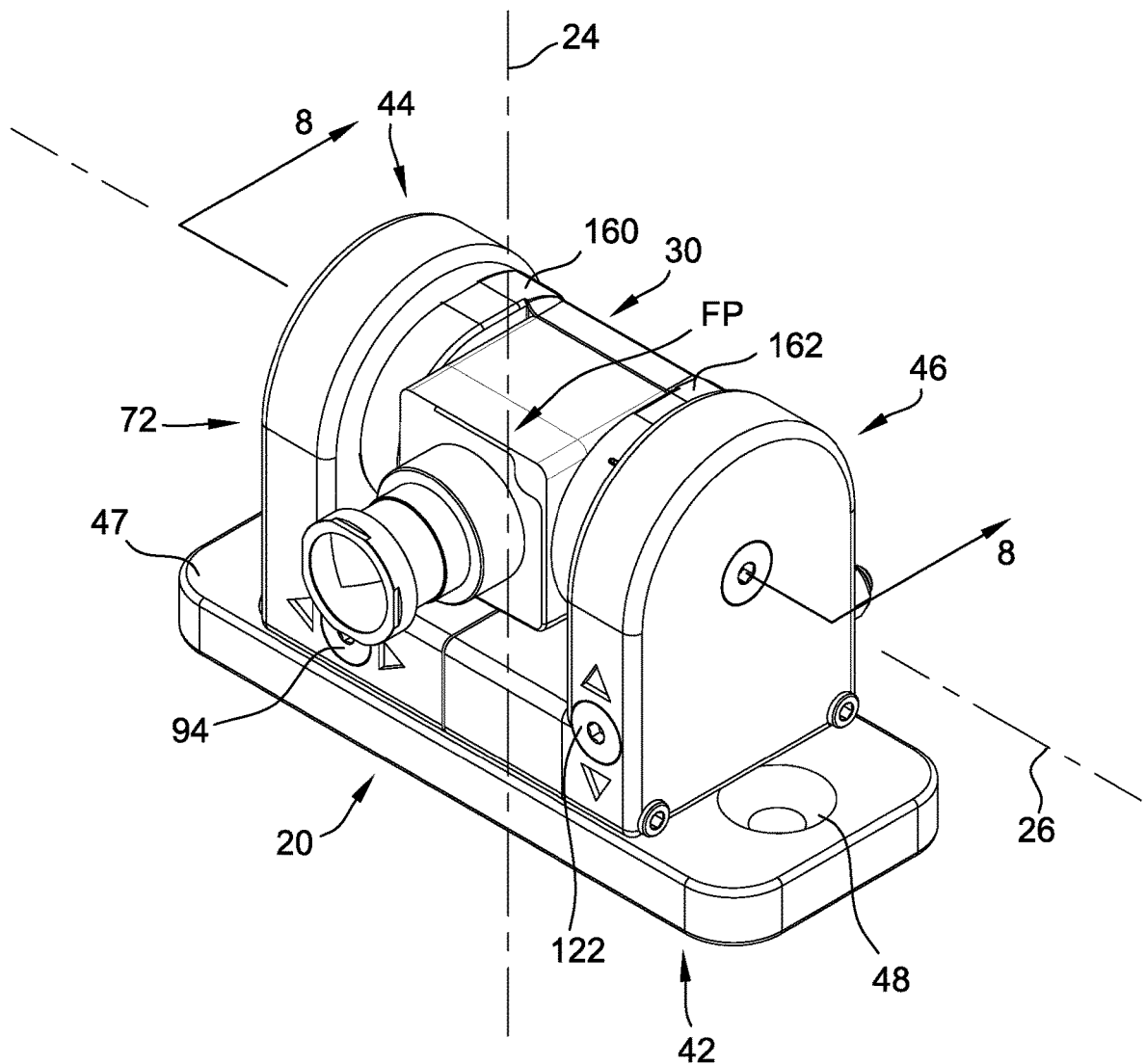
FIG. 2 is an isometric view of the adjustable mount with the camera supported by the mount and the camera position without yaw or pitch adjustments to the camera orientation.
Figure 3:
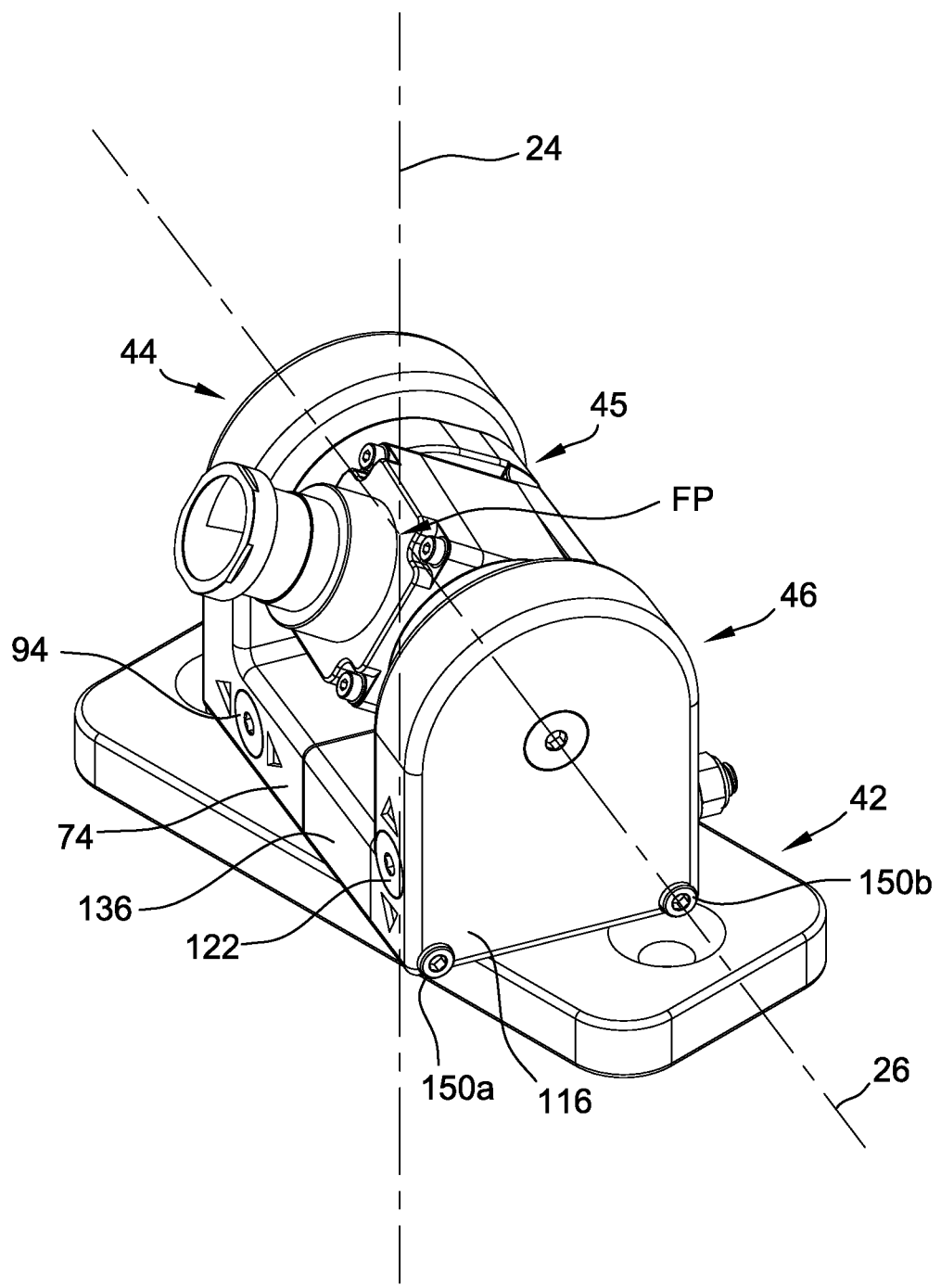
FIG. 3 is the adjustable mount of FIG. 2 with adjustments made to the yaw and pitch orientations of the camera supported by the mount.
Figure 7:
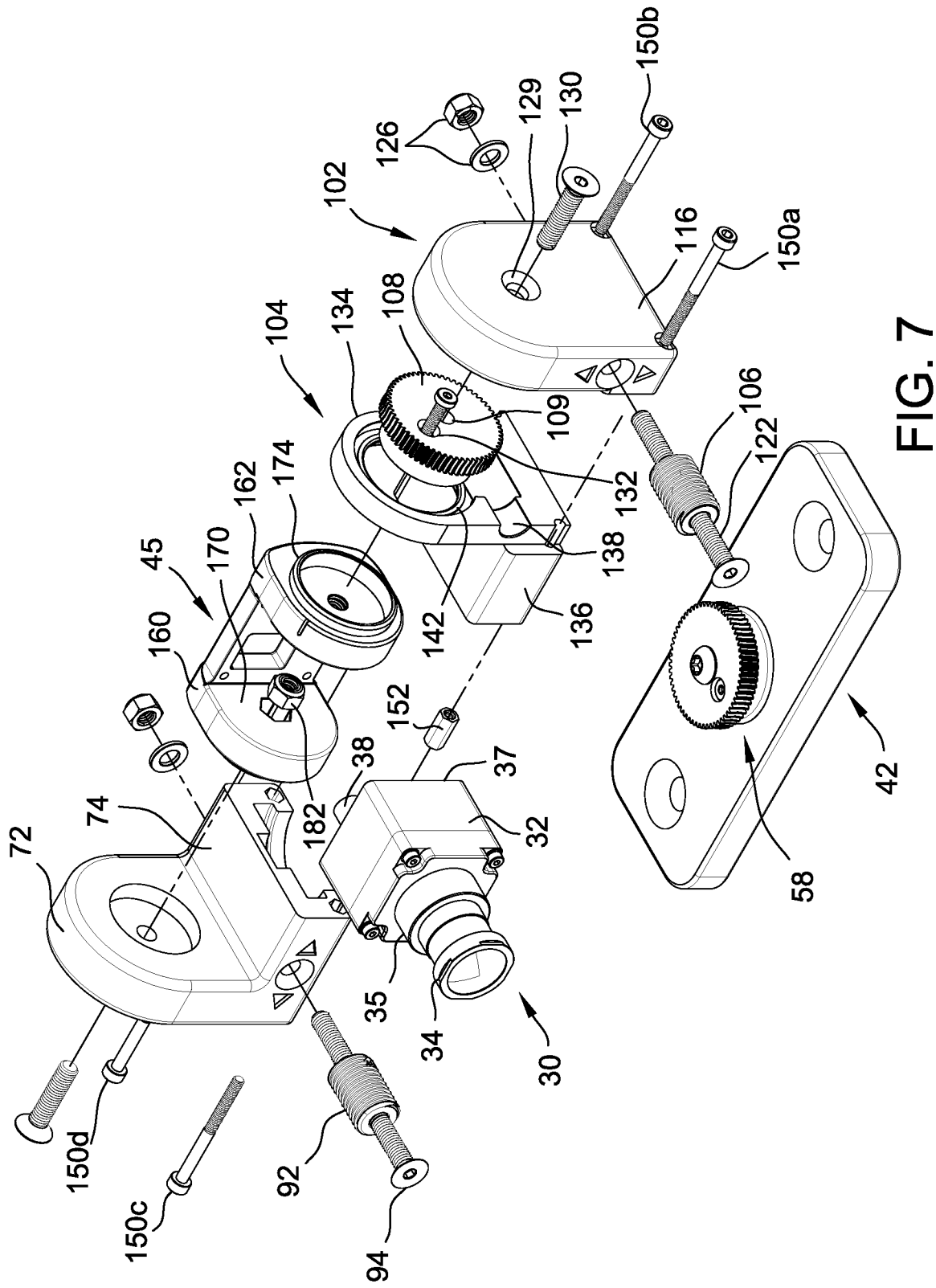
FIG. 7 is an exploded view of the assembly of the mount of the embodiment of the present disclosure and includes the yaw and pitch subassemblies shown in FIGS. 4 and 6 respectively.

In FIG. 1, two mounts 40 are shown attached to the frame 18 in spaced relation along the frame. As will be described herein, the mount 40 may be attached to the frame using bolts, screws or other suitable conventional fasteners. The mounts are shown attached to the frame 18 above the windshield 14. It should be understood that the mount may be attached to the cab 12 at any suitable location, such as vehicle bumper 15, side of the cab 17, or rear cab portion 19. As shown in FIGS. 1, 2 and 3, the mount 40 is adapted to support a camera 30. The camera may comprise, for example, an RGB camera configured for use in automotive or other systems. However, it should be understood that the camera may comprise any camera, sensor or information gathering device that is able to view the area surrounding vehicle 10. As shown in FIG. 7, the camera includes a housing 32 that encloses components and circuitry used to process images obtained through lens 34 that extends outwardly from the front portion 35 of the housing 32. A shroud 38 is made integral with the housing 32 and extends outward from the rear portion 37 of the housing 32. The shroud may comprise a hollow member such as a hollow cylindrical member. Wires, cables or other connection members (not specifically shown) for providing power to the camera or for transmitting images obtained by the camera to a controller extend from the housing and are inserted through the hollow shroud and to the associated power supplying component or controller.

Turning to FIGS. 2, 3, 4 and 7, the adjustable mount 40 comprises a base 42, a yaw adjustment assembly 44, a pitch adjustment assembly 46, and a camera mount 45, that is located between the pitch and yaw adjustment assemblies in the mount 20 . . . . The yaw adjustment assembly 44 and the pitch adjustment assembly 46 are supported by the base 42.

Figure 4:
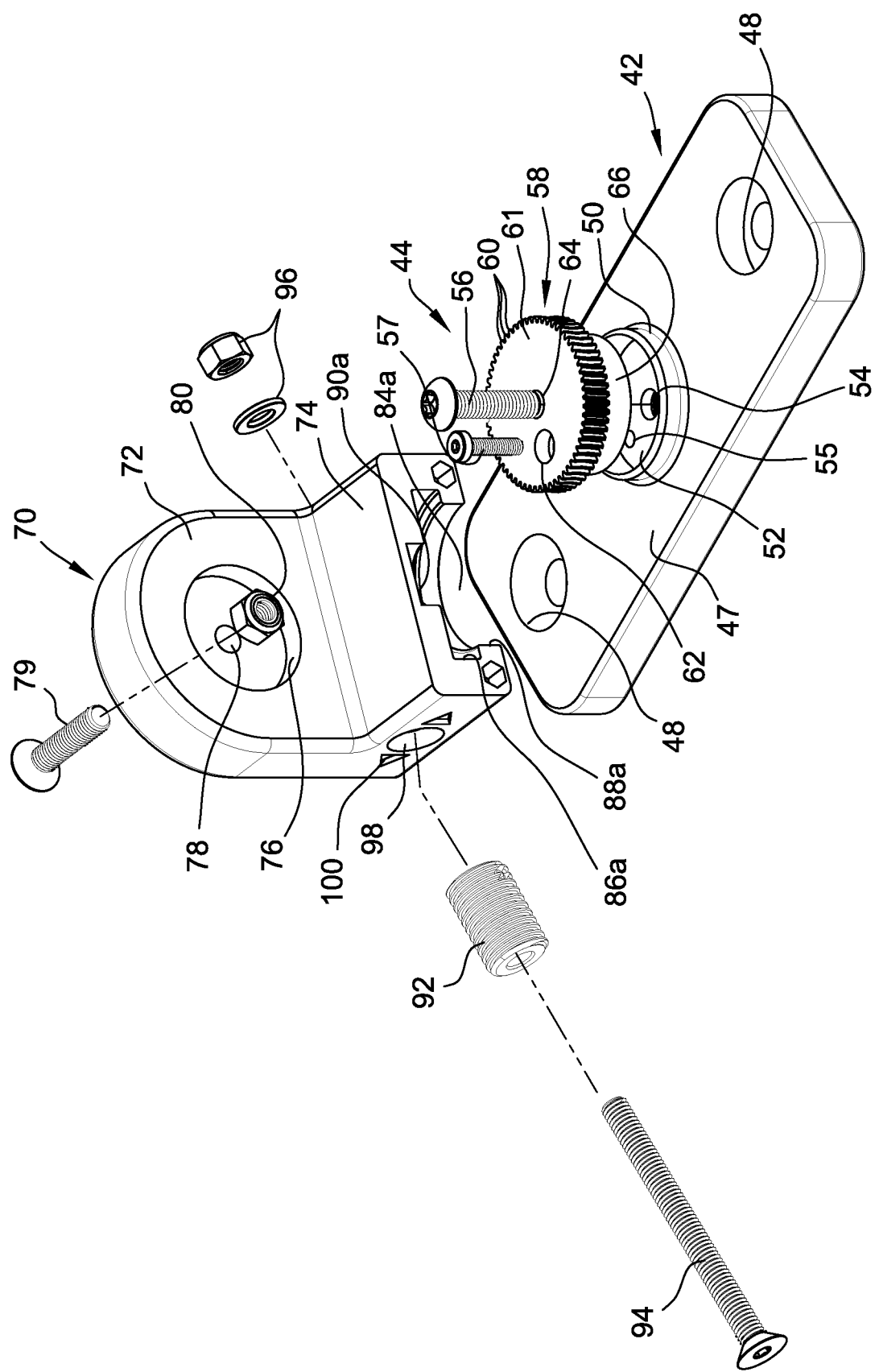
FIG. 4 is an exploded view of the subassembly for making yaw orientation adjustments to the camera supported by the mount of the embodiment of the present disclosure.

The camera 30 is in turn supported by the adjustable mount 40. As shown in FIG. 4, the base 42 includes a pair of spaced apart bores 48 that are located near the ends of the base 42. The bores 48 extend through the base and are adapted to receive a fastener (not shown). In use, the fastener extends through the bores and is tightened to fixedly locate the mount 40 on the vehicle 10 at frame 18.

As shown in FIG. 2, exemplary reference axis 20 includes axes labeled as "X", "Y" and "Z". Note that the axes could be identified in any manner and using any suitable associated reference labels. The reference axes are used to orient and describe the pitch and yaw movement of the camera supported by the mount 40. In FIG. 2 and FIG. 3, a pitch axis of movement 26 and a yaw axis of movement 24 are shown. The orientation of the pitch axis of movement 26 is aligned with the axis identified as "X" of reference axes 20. The orientation of the yaw axis of movement 24 is aligned with the axis identified as "Y" of reference axes 20. In use, when it is necessary to modify the pitch orientation of the camera 30, the camera is reoriented by rotating the camera about axis 26 using pitch assembly 44. When it is necessary to modify the yaw orientation of the camera 30, the yaw adjustment assembly 44, pitch adjustment assembly 46 and camera 30 are rotated about the yaw axis 24 relative to the base 42. As shown in FIGS. 2 and 3, the yaw rotation axis 24 and pitch rotation axis 26 intersect at an intersection point, identified as FP in FIGS. 2 and 3. The intersection point of the axes coincides with the focal point or origin of the camera when the camera is located in support 45. When the pitch orientation of the camera 30 is modified, the support 45 and attached camera 30 are rotated about pitch rotation axis 26 at the intersection point FP which coincides with the camera's focal point. When the yaw of the camera 30 is modified, the camera support 45, and assemblies 44 and 46 and camera 30 are rotated about yaw axis 24 at the intersection point FP.

As shown in FIG. 4, the base 42 includes an annular rim 50 located between bores 48. The rim extends upwardly from the top surface 47 of base 42 and surrounds and thereby defines a seat 52 along the top surface 47. A threaded bore 54 is formed at the center of the circular seat 52 and the threaded bore extends through the base 42. A second threaded bore 55 is radially offset from bore 54 and located between the central bore 54 and the rim 50. The threaded bore 55 extends through the base 42. Bore 54 receives threaded fastener 56 and bore 55 received threaded fastener 57. Both fasteners 56 and 57 are shown in FIG. 4.

Figure 5:
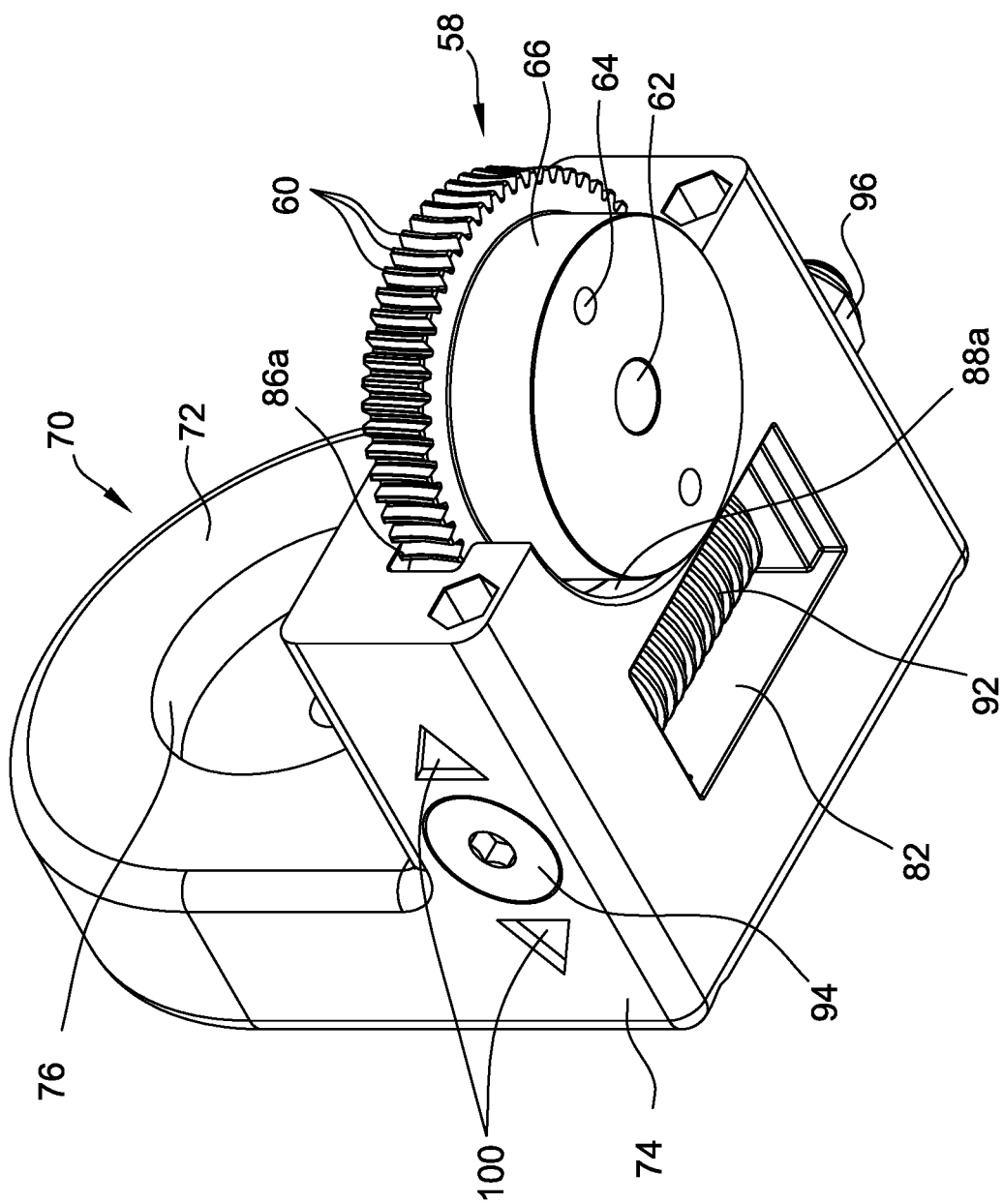
FIG. 5 is a bottom view of a yaw gear housing of the yaw assembly of FIG. 4.

The yaw adjustment assembly 44 includes a yaw wheel 58 having a circular body 61 with a plurality of teeth 60 spaced apart along the outer periphery of the yaw wheel. The yaw wheel includes a central opening 62 and opening 64 that is radially spaced from central opening 62 and the outer yaw wheel periphery that includes teeth 60. A cylindrical hub 66 is made integral with the wheel body 61 along one side of the yaw wheel as shown in FIG. 4 and FIG. 5. The cylindrical hub has a diameter that enable the hub to be located in the seat defined by the rim 50. As shown in FIG. 5, the central opening 62 and radially offset opening 64 extend through the wheel and the hub. In use, the hub is located in the seat 52 defined by the rim 50 and the central opening 62 and radial opening 64 are aligned with respective threaded central bore 54 and threaded radially offset bore 55 that extend through the base 42. After the hub is located in the seat, fasteners 56 and 57 are inserted in their respective openings, thereby holding the wheel in place in the seat. Note that in addition to central fastener 56, radially offset fastener 57 serves to further prevent rotation of wheel 56, and maintain the wheel stationary during use.

FIG. 5 shows a yaw gear housing 70 of the yaw adjustment assembly 44 shown in FIG. 4. In use, as shown in FIGS. 2 and 3, the gear housing is supported on the top surface 47 of the base 42. The gear housing is L-shaped and includes a support portion 72 and a lower portion 74 that is perpendicular to the support portion 72. When supported by the base 42, the support member is oriented vertically, relative to the base. The support portion 72 includes a circular recess 76 that extends through a portion of the vertical support portion. A support member bore 78 is provided in the vertical support and extends therethrough. The support member 78 is adapted to receive a fastener 79 and the free end of the fastener 79 that extends from the support member bore is fastened in place by a nut 80 or other suitable fastening member.

Figure 8:
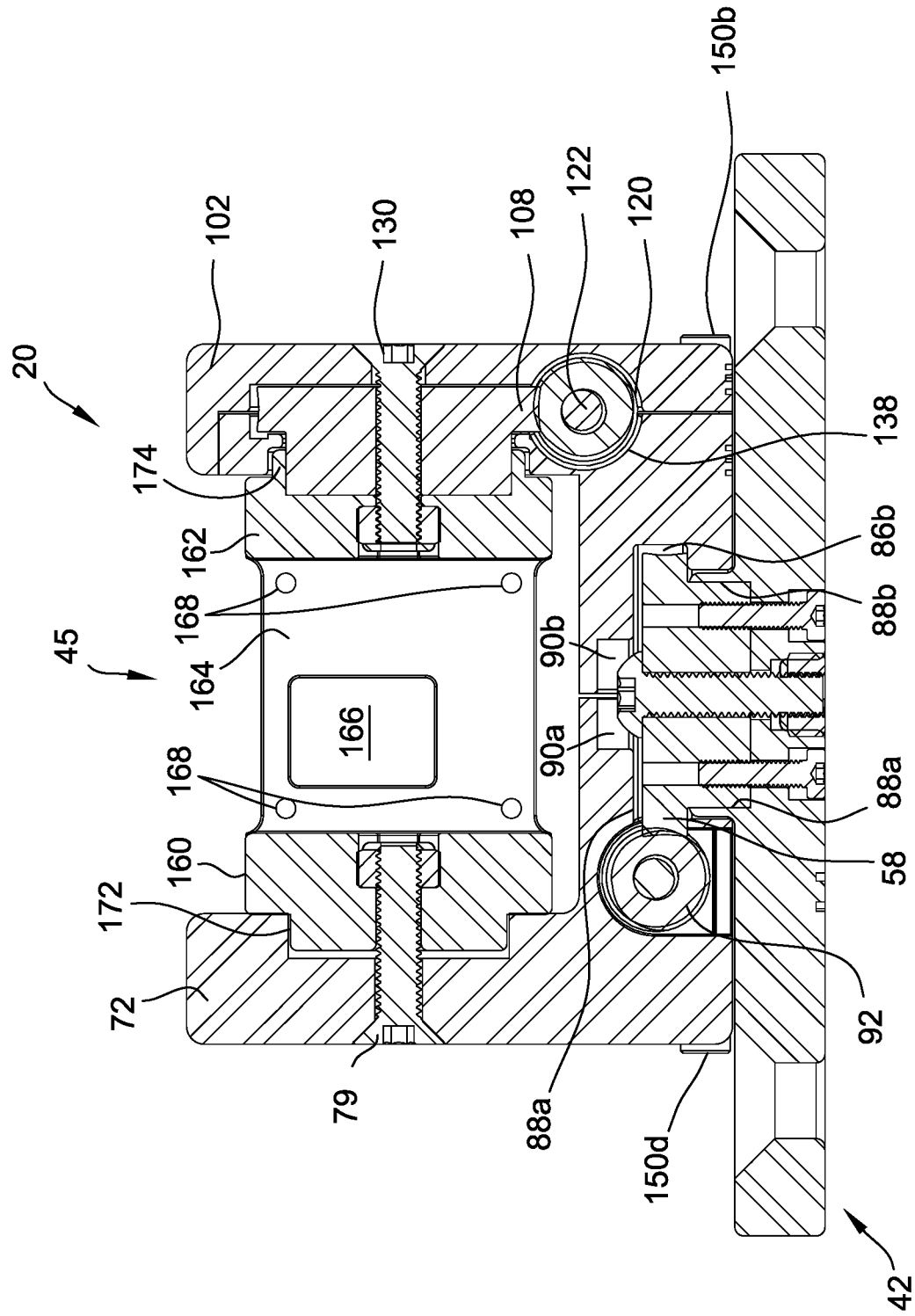
FIG. 8 is a sectional view of the adjustable mount of FIG. 2, taken along line 8-8 of FIG. 2.

FIG. 4 and FIG. 5 show the chamber portion 74 that is provided with a worm gear chamber 82 and yaw wheel chamber 84. The wheel chamber 84 has a T-shaped configuration with an upper chamber 86a adapted to receive a portion of the yaw wheel 58 and a lower chamber 88a adapted to receive a portion of the hub 66 when the support 72 is seated on the base top surface 47. See FIG. 5. A recess 90a is provided above the upper chamber and receives a portion of the head of fastener 56 when the wheel and hub are partially located in the yaw wheel chamber 84. A yaw worm gear 92 is located in the worm gear chamber 82, and once located in the chamber 82, a threaded fastener is passed through opening 98, and is threadably connected to the yaw worm gear 92. Once the fastener 94 exits the chamber 82 through an opening (not shown) aligned with opening 98, a nut 96 is fixed to the free end of the fastener, thereby maintaining the yaw worm gear in the chamber 82. As best shown in FIG. 8, when the yaw worm gear 92 is located in chamber 82, and yaw wheel 58 is located in upper chamber 86a, the teeth 60 of the yaw wheel 58 are in engagement with the spiral thread of the worm gear.

Pitch adjustment assembly 46 comprises outer pitch gear housing 102, inner pitch gear housing 104 that is adapted to be mated with the outer pitch gear housing, and worm gear 106 and pitch wheel 108 that are located in the outer pitch gear housing 104. When located in the pitch wheel 108, the pitch wheel teeth 110 engage the spiral provided in the worm gear 106. The teeth 110 are spaced along the outer periphery of the wheel 108 and cylindrical hub 112 extends from the inner side of the pitch wheel 108.

The inner pitch gear housing 102 includes a hollow interior 114 that is closed on one side by wall 116. A hole 129 extends through the wall. See FIG. 7. The wall 116 and U-shaped sidewall 117 define a chamber 118. A pair of spaced apart collars 120 extend from the sidewall and are located in the chamber 118. Each collar includes a threaded passage 120 that is adapted to receive a fastener 122. In use, the worm gear 106 is located in the distance separating the collars. After the worm gear 106 is located between the collars 120, the fastener 122 is threadably passed through the collars and worm gear and a nut 126 is located on the free end of the fastener to maintain the fastener stationary. Pitch adjustment indicia 124 is provided on the exterior of sidewall 117. As will be discussed further below, the fastener 122 is rotated to modify the pitch of the camera consistent with indicia 124. A semicircular recess 128 is formed along the interior of the wall 116. The semi-circular arc has ends proximate the free ends of collars 120 in chamber 118. When in use, the pitch wheel is located in the recess 128 and the teeth 110 located at the open portion of the semicircular recess 128 are in engagement with the worm gear spiral. See FIG. 8.

The inner pitch gear housing 104, includes a vertical support portion 134 and a chamber portion 136 that is integral with the vertical support 134. The vertical support is perpendicular to the chamber portion 136. In use, the inner and outer pitch gear housings are located on the top surface 47 of base 42. The vertical member 134 is nested within the outer pitch gear housing 102 and located in the chamber 118. Semi-cylindrical recesses 138 are formed in the inner pitch gear housing vertical support. The recesses 138 are spaced apart. As nested in the chamber 118, each recess 138 receives a respective collar 120 and the worm gear 106 is located in the space between the recesses 138.

The bearing opening 140 extends through the vertical support 134. The pitch wheel is partially located in an annular bearing seat 142 and the hub 112 passes through the bearing opening 140. When the inner pitch gear housing 134 is nested in chamber 118, a portion of the pitch wheel 108 is located in bearing seat 142 and in outer pitch gear housing recess 128. Additionally, the worm gear is located partially in the spaces between recesses 138 and collars 120. See FIG. 8. Fastener 130 is passed through opening 129 and fastened to the pitch wheel 108 through central pitch wheel opening 109. Fastener 132 also fixes the pitch wheel to the hub 112.

Figure 6:
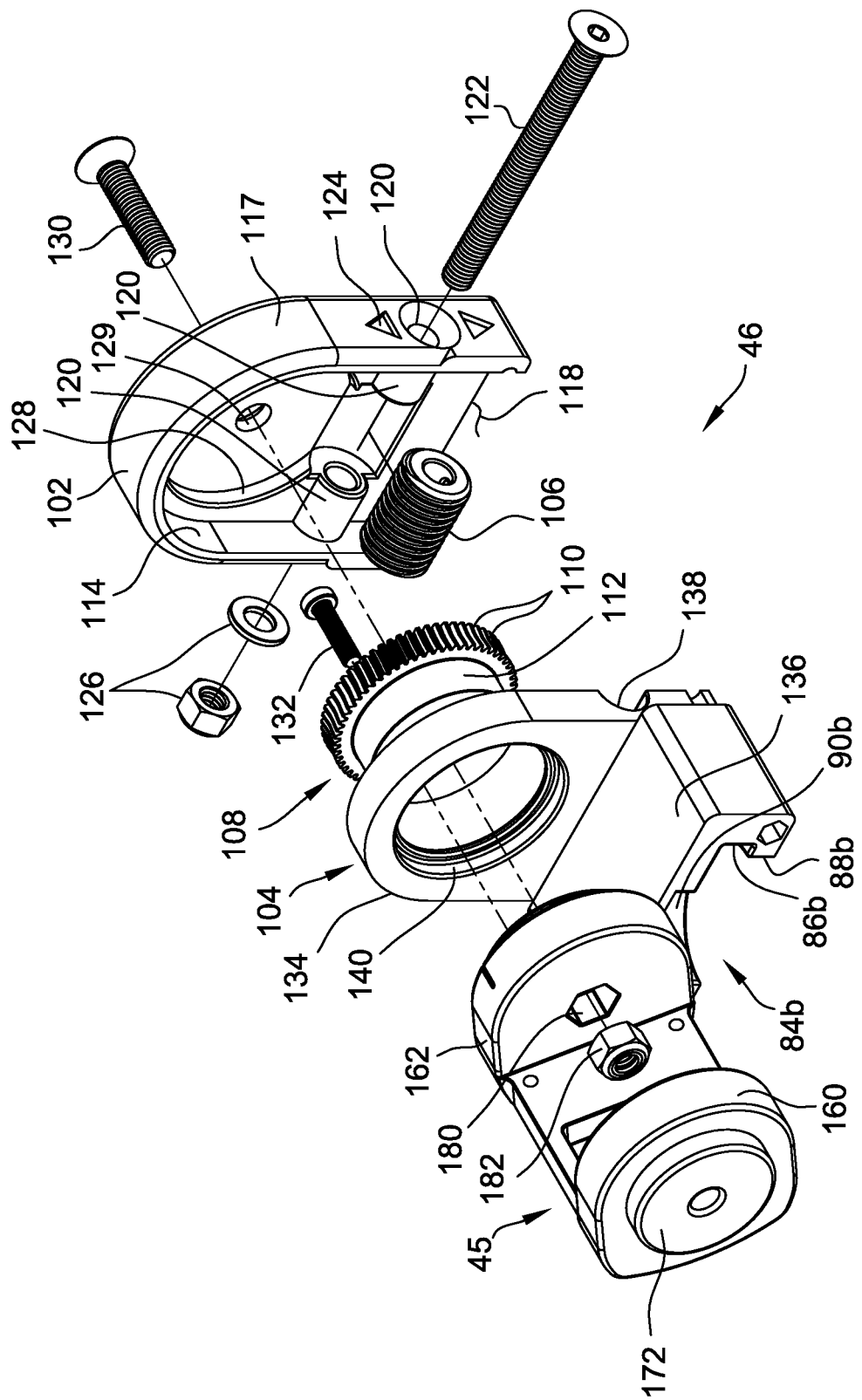
FIG. 6 is an exploded view of the subassembly for making pitch orientation adjustments to the camera supported by the mount of the embodiment of the present disclosure.

As shown in FIG. 6, the chamber portion 136 includes a T-shaped wheel chamber 84b having lower chamber portion 88b, upper chamber portion 86b and recess 90b. The chamber 84b is similarly configured to chamber 84a of the chamber portion 74.

As described in similar wheel chamber 84a, the lower chamber 88b receives a portion of hub 66, the upper chamber receives a portion of wheel 58 and the head of fastener 56 is partially located in recess 90b. As shown in FIG. 8, when the mount is assembled, the chamber portions are moved into abutment, and the fastener head is enclosed in recesses 90a, 90b; wheel 58 is enclosed in upper chamber portions 86a, 86b; and the hub 66 is enclosed in lower chamber portions 88a, 88b.

When the mount 40 is assembled the camera support 45 is located between vertical supports 72 and 104. See FIGS. 2, 3, 7 and 8. The camera support 45 includes a pair of spaced support flanges 160, 162 that are joined at one end to wall 164. The wall extends between the flanges. The flanges and wall define a space 170 that is adapted to receive the camera 30 or other sensor or means for monitoring the area surrounding the vehicle. When located in space 170, camera lens 38 is inserted through an opening 166 formed in the wall 164 and fasteners are inserted in holes formed in the wall to secure the camera to the wall and maintain the camera 30 stationary in the space 170 of mount 45. The outer portion of each flange 160 and 162 includes a bearing hub member. Support flange 160 includes a cylindrically shaped bearing hub 172 and support flange 162 includes annular bearing hub 174. Openings terminating along the interior wall by a hex shape 180 are provided in the support flanges 160, 162. The hex shape is provided on the interior of the support flanges 160, 162 and they are adapted to receive a hex nut 182 that may be fastened to the fasteners 79 or 130, previously described. See FIG. 8.

As assembled, bearing hub 172 is located in the recess 76 of the vertical support 72 and hub 112 is located in the recess defined by annular bearing hub 174. The hex nuts are located in hex-shaped openings 180 on the support flanges 160, 162, and thereby are prevented from rotating during use. Fastener is inserted through the support member wall 116, pitch wheel 108, hub 112 and support flange 162 and tightened from rotation by the hex nut. Fastener 79 is passed through vertical support 72, bearing hub 172 and support flange 160 and prevented from further rotation by the hex nut. Fasteners 150a and 150b, are passed through the chamber portions 74 and 136 and fasteners 150c and 150d are passed through the outer pitch gear housing 102 and chamber portion 136 to lock the mount 40 in place during use. Hex nuts 152 receive the ends of opposed fasteners to prevent the fasteners from counterrotation. As a result of the connection members 150a, 150b, 150c and 150d, the yaw and pitch adjustment assemblies 44, 46 respectively move as a single unity when the yaw orientation of mount 20 is adjusted about axis 24. See FIG. 3.

The components of the mount 40, such as base 45 and yaw adjustment and pitch adjustment assemblies 44 and 46 respectively may be made of any material suitable to withstand the environmental conditions the mount will be subjected to when in use on vehicle 10. The components base assemblies and the component parts of the assemblies may, for example be made from stainless steel.

Figure 9:
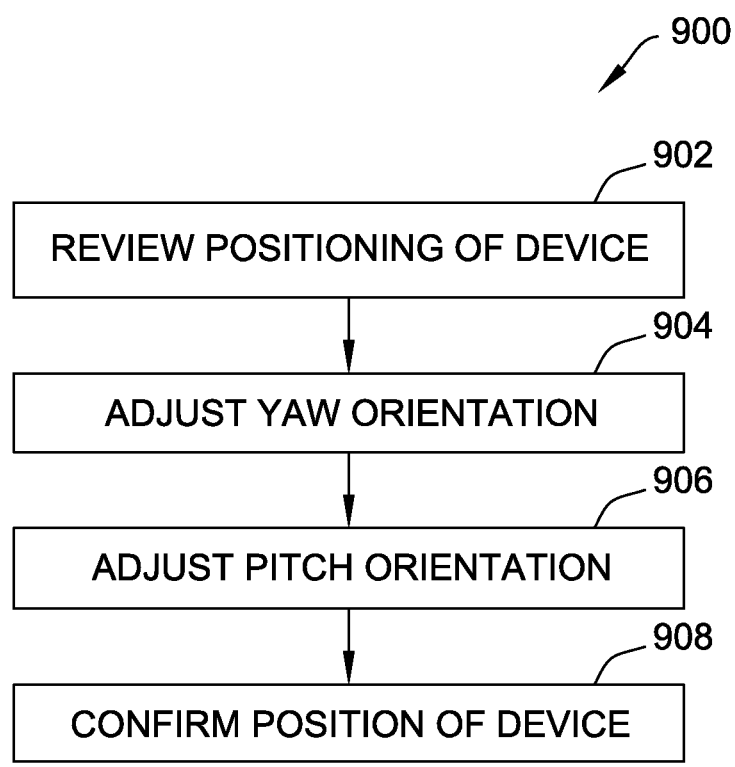
FIG. 9 is an exemplary flow chart representation of a method for adjusting the orientation of the camera supported by the adjustable mount shown in FIGS. 2 and 3 according to embodiments of the present disclosure. of the embodiment of the present disclosure.

FIG. 9 is an exemplary flow chart representation of a method 900 for adjusting the orientation of the camera supported by the adjustable mount shown in FIGS. 2 and 3 according to embodiments of the present disclosure. According to the method, the orientation of the orientation of the camera 30 may be adjusted about two axes, yaw rotation axis 24 and pitch rotation axis 26 where the axes intersect at the focal point FP of the camera 30. The rotation of fastener 94 causes yaw worm gear 92 to rotate and engage yaw wheel 58. The engagement causes the mount 20 including pitch adjustment assembly 46, yaw adjustment assembly 44 and support 45 to rotate as a single unit about axis 24 at the intersection point or camera focal point FP, thereby adjusting the yaw angle and orientation of the camera. Sec FIG. 3. Alternatively, when it is necessary to change the pitch angle of camera 30, fastener 122 is rotated. This rotation rotates pitch worm gear 106. The pitch worm gear spiral engages the teeth of pitch wheel 108 and in turn, causes the camera support to rotate about pitch axis 26 at intersection point FP. See FIG. 3. As a result of these fine adjustments, the viewing angle of the camera may be easily and accurately modified. The reorientation of the camera can only be modified by turning the screws thereby lessening the negative impacts of vibratory disturbances on the camera orientation. The combination of the geared adjustments and positioning screws increase the rigidity of the mount and enable fine adjustments to be made.

In FIG. 9, at 902, a user may look through shroud 38 and lens 34 to confirm that the camera is oriented at the area of interest surrounding the vehicle. If based on the review 902 the user determines that the orientation of the camera needs to be adjusted, at 904 the user may adjust the yaw orientation of the mount and camera by rotating fastener 94 in the direction of rotation required to effectively modify the yaw orientation. If based on the review 902 the user determines the orientation of the camera needs to be adjusted, at 906 the user may adjust the pitch orientation of the mount and camera by rotating fastener 122 in the direction of rotation required to effectively modify the pitch orientation of the camera 30. At 908, the user may then confirm the camera is in the desired orientation.

In summary, the disclosed apparatus enables precise adjustments in pitch and yaw orientations using yaw adjustment and pitch adjustment assemblies that are supported by a base. The yaw adjustment assembly provides controlled movement along the yaw axis. Concurrently, the pitch adjustment assembly, positioned adjacent to the yaw assembly, moves with the pitch assembly. A camera assembly is moveable about yaw and pitch axes. More specifically, the camera assembly is movable about the intersection point of the pitch and yaw axes. Moving the camera assembly about the intersection point, allows for specific, precise adjustments in the pitch and yaw orientations of the camera support of the camera assembly about the intersection point of the axes. This technical arrangement ensures meticulous control over the pitch and yaw orientations of the mount.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

We claim:

1. A mount for adjusting the orientation of a camera, the mount comprising:
 a base;
 a yaw adjustment assembly located on the base and movable about a yaw axis in response to a movement of a yaw adjustment fastener;
 a pitch adjustment assembly located on the base, the pitch adjustment assembly being located adjacent the yaw adjustment assembly on the base; and
 a camera support, the camera support being located between the yaw adjustment assembly and pitch adjustment assembly, the camera support being rotatable about a pitch axis, the pitch axis and the yaw axis intersecting at an intersection point, the pitch orientation of the camera support being adjustable about the pitch axis at the intersection point and the yaw orientation of the pitch and yaw assemblies and support being adjustable about the yaw axis at the intersection point.

2. The mount of claim 1 wherein the yaw adjustment assembly further comprises:
 a yaw wheel supported by the base, the yaw wheel including a plurality of teeth spaced along a yaw wheel periphery; and
 a yaw gear housing including a first chamber adapted to partially receive the yaw wheel, a second chamber adjacent the first chamber, and a yaw worm gear located in the second chamber, the yaw worm gear adapted to engage the teeth of the yaw wheel when the worm gear is located in the second chamber.

3. The mount of claim 2 wherein the yaw gear housing further comprises a vertical support and a chamber portion, the vertical support and chamber portion being perpendicular, the first and second chambers being located in the chamber portion.

4. The mount of claim 2 wherein the yaw worm gear is movably connected to the yaw adjustment fastener and wherein movement of the yaw adjustment fastener adjusts the yaw orientation of the yaw adjustment assembly, the pitch adjustment assembly and the camera support.

5. The mount of claim 1 wherein the pitch adjustment assembly further comprises an outer pitch gear housing that defines a chamber, an inner pitch gear housing that may be nested in the outer pitch gear housing chamber, a pitch wheel having a plurality of teeth along an outer periphery of the pitch wheel and pitch worm gear, the pitch wheel and pitch worm gear located in the outer pitch gear housing chamber and wherein the teeth of the pitch wheel engage the pitch worm gear when the pitch wheel and pitch worm gear are located in the chamber of the outer pitch gear housing.

6. The mount of claim 5 wherein the pitch worm gear is movably connected to a pitch adjustment fastener and wherein movement of the pitch adjustment fastener adjusts the pitch orientation of the camera support at the intersection point.

7. The mount of claim 5 wherein the inner pitch gear housing includes an inner pitch gear housing vertical support and an inner gear housing chamber portion perpendicular to the inner pitch gear housing vertical support, the inner pitch housing chamber portion including a chamber, the inner pitch housing and outer pitch housing being supported by the base, and wherein a yaw wheel is partially located in the chamber of the inner pitch housing when the inner pitch housing is supported along the base.

8. The mount of claim 7 wherein the vertical support of the inner pitch housing includes a bearing opening, a pitch wheel hub being connected to the pitch wheel, the hub being supported in the bearing opening when the inner pitch gear housing is nested in the outer pitch gear housing chamber.

9. The mount as claimed in claim 1 wherein the camera support includes first and second spaced support flanges, the first and second support flanges being joined by a wall.

10. The mount as claimed in claim 9 wherein the camera support is movably supported at the first and second support flanges by the yaw adjustment assembly and the pitch adjustment assembly respectively.

11. The mount as claimed in claim 9 wherein the pitch adjustment assembly further comprises a pitch wheel, and the first support flange includes a bearing hub, the second support flange includes an annular bearing hub, the bearing hub of the first support flange being further supported by the yaw adjustment assembly and the pitch wheel being supported by the annular bearing hub.

12. A mount for adjusting the orientation of a camera, the mount comprising:
 a base;

a yaw adjustment assembly located on the base and movable about a yaw axis, the yaw adjustment assembly comprising:
  a yaw wheel supported on the base;
  a yaw gear housing supported on the base, the yaw gear housing comprising a yaw worm gear chamber, and a yaw wheel chamber;
  a yaw worm gear located in the yaw worm gear chamber, a portion of the yaw wheel located in the yaw wheel chamber when the yaw gear housing is located on the base, the yaw worm gear and yaw wheel being in engagement; and
  a fastener connected to the worm gear to rotate the worm gear in response to movement of the fastener;
a pitch adjustment assembly located on the base and connected to the yaw adjustment assembly to be movable with the yaw assembly about the yaw axis, the pitch adjustment assembly comprising:
  an outer pitch gear housing defining a chamber;
  a pitch wheel and a pitch worm gear located in the chamber, the pitch worm gear being in engagement with the pitch wheel;
  a pitch fastener connected to the pitch worm gear to rotate the pitch worm gear in response to movement of the pitch fastener; and
  an inner pitch gear housing comprising an inner pitch gear housing chamber, a portion of the yaw wheel being located in the inner pitch gear housing chamber when the pitch adjustment assembly is located on the base; and
a camera support, the camera support being located between and connected to the yaw adjustment assembly and pitch adjustment assembly to be movable with the pitch and yaw assemblies about the yaw axis, the camera support also being rotatable about a pitch axis in response to movement of the pitch fastener, the pitch axis and the yaw axis intersecting at an intersection point, the pitch orientation of the camera support being adjustable about the pitch axis at the intersection point and the yaw orientation of the pitch and yaw assemblies and support being adjustable about the yaw axis at the intersection point.

13. A method for adjusting the pitch and yaw orientations of a camera mount where the camera mount comprises a base, a yaw adjustment assembly, a pitch adjustment assembly connected to the yaw adjustment assembly where the yaw and pitch adjustment assemblies are supported on the base, and a camera support connected to the yaw and pitch adjustment assemblies to be movable with the assemblies about a yaw axis in response to movement of a yaw fastener, the camera support being rotatable about a pitch axis in response to movement of a pitch fastener; the method comprising:
  reviewing a position of the mount, and
  wherein based on the review, the method further comprising:
  adjusting the yaw orientation of the yaw and pitch assemblies and camera support by rotating the yaw fastener to thereby move the assemblies and support about the yaw axis; and
  adjusting a pitch orientation of the camera support by rotating the pitch fastener to thereby move the camera support about a pitch axis.

* * * * *